United States Patent
Yamamoto

(10) Patent No.: US 10,304,160 B2
(45) Date of Patent: May 28, 2019

(54) ADJUSTMENT OF CONTENT DISPLAY DURING SCROLLING

(71) Applicant: Rakuten, Inc., Tokyo (JP)

(72) Inventor: Yoji Yamamoto, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/789,481

(22) Filed: Oct. 20, 2017

(65) Prior Publication Data

US 2018/0040102 A1 Feb. 8, 2018

Related U.S. Application Data

(63) Continuation of application No. PCT/JP2015/079986, filed on Oct. 23, 2015.

(30) Foreign Application Priority Data

Oct. 21, 2016 (JP) .................. 2016-206989

(51) Int. Cl.
*G06F 3/14* (2006.01)
*G06T 3/20* (2006.01)
(Continued)

(52) U.S. Cl.
CPC .............. *G06T 3/20* (2013.01); *G06F 3/0485* (2013.01); *G06F 3/1423* (2013.01); *G06F 13/00* (2013.01);
(Continued)

(58) Field of Classification Search
None
See application file for complete search history.

(56) References Cited

U.S. PATENT DOCUMENTS 5,923,327 A * 7/1999 Smith ................... G06F 3/0481
715/784
6,337,694 B1 * 1/2002 Becker ............... G06F 3/04855
345/684
(Continued)

FOREIGN PATENT DOCUMENTS

JP 2014-186541 A 10/2014

OTHER PUBLICATIONS

International Search Report of PCT/JP2015/079986 dated Jan. 12, 2016 [PCT/ISA/210].

*Primary Examiner* — Asher D Kells
(74) *Attorney, Agent, or Firm* — Sughrue Mion, PLLC

(57) ABSTRACT

An information processing device includes a web page data generating unit that generates web page data. The web page data causes the terminal device to execute an arrival determination process that determines whether a page-side reference position set as an end position in a forward scroll direction of a predetermined content part among the plurality of content parts has arrived at a screen-side reference position set at a browser screen side of the terminal device in association with scroll in a forward direction or not, and a display control process that slows a scroll following speed of a content part subsequent to the page-side reference position than a scroll following speed of a content part preceding the page-side reference position, and causes an additional content to appear in a space that is expanding between the page-side reference position and the preceding content part by the slowing.

9 Claims, 12 Drawing Sheets

(51) Int. Cl.
*G09G 5/34* (2006.01)
*G06F 13/00* (2006.01)
*G06F 17/21* (2006.01)
*G06T 11/60* (2006.01)
*G06F 3/0485* (2013.01)

(52) U.S. Cl.
CPC ............ *G06F 17/212* (2013.01); *G09G 5/34* (2013.01); *G06T 11/60* (2013.01); *G09G 2370/022* (2013.01); *G09G 2370/027* (2013.01)

(56) References Cited

U.S. PATENT DOCUMENTS

| | | | | |
|---|---|---|---|---|
| 8,904,306 B1* | 12/2014 | Whitney | ............ | G06F 3/04883 345/156 |
| 9,510,036 B1* | 11/2016 | Lewis | ............ | G06F 16/738 |
| 2008/0103899 A1* | 5/2008 | Blinnikka | ............ | G06Q 30/02 705/14.69 |
| 2012/0123874 A1* | 5/2012 | Park | ............ | G06Q 30/02 705/14.69 |
| 2012/0272136 A1* | 10/2012 | Takami | ............ | G06F 16/9535 715/234 |
| 2013/0238433 A1* | 9/2013 | Kamdar | ............ | G06Q 30/0241 705/14.53 |
| 2014/0089110 A1* | 3/2014 | Kazama | ............ | G06Q 30/0277 705/14.73 |
| 2014/0181733 A1* | 6/2014 | Oyanagi | ............ | G06F 3/0485 715/785 |
| 2015/0007101 A1* | 1/2015 | Lewis | ............ | G06F 3/0485 715/784 |
| 2015/0324376 A1* | 11/2015 | Jeon | ............ | G06F 16/957 715/234 |
| 2016/0357382 A1* | 12/2016 | Metz | ............ | G06F 3/0485 |
| 2017/0017369 A1* | 1/2017 | Kanter | ............ | G06F 3/0485 |
| 2018/0121049 A1* | 5/2018 | Park | ............ | G06F 3/0485 |
| 2018/0199110 A1* | 7/2018 | Cormican | ............ | H04N 21/4821 |
| 2018/0260846 A1* | 9/2018 | Diep | ............ | G06Q 30/0255 |

* cited by examiner

ADJUSTMENT OF CONTENT DISPLAY DURING SCROLLING

CROSS-REFERENCE TO RELATED APPLICATIONS

This application is a continuation of International Application No. PCT/JP2015/079986, filed Oct. 23, 2015. Also, this application claims priority benefit of Japanese Application No. JP2016-206989, filed Oct. 21, 2016. The above applications are hereby incorporated by reference.

TECHNICAL FIELD

The present invention relates to an information processing device and program, an information processing method, and a storage medium that stores the program, and especially relates to a technical field according to content display control on a web page.

CITATION LIST

Patent Literature

Patent Literature 1: Japanese Unexamined Patent Application Publication No. 2014-186541

BACKGROUND ART

On the web page, besides a main content, for example, a specific target image is sometimes presented. For example, taking a web page as a blog (weblog) as an example, besides the main content as a blog article, an advertising image is presented.

Above-described Patent Literature 1 can be exemplified as a related prior art.

SUMMARY OF THE INVENTION

Technical Problem

At this time, depending on a way of presenting the target image, the target image may become an obstacle in browsing of another content. For example, when the target image is presented superimposed on another content to intend to easily obtain user's attention, this poses an obstacle to the browsing of the content.

The present invention has been made in view of the above-described circumstance, and it is an object of the present invention to present an additional content such as a target image on a web page, while managing to easily obtain attention to the additional content from a user and not to cause the additional content to be an obstacle in browsing of a content at the same time.

Solution to the Problem

An information processing device according to the present invention includes a web page data generating unit that generates web page data as web page data to cause a terminal device to display a web page on which a plurality of content parts are arrayed in a scroll direction, the web page data causes the terminal device to execute an arrival determination process that determines whether a page-side reference position set as an end position in a forward scroll direction of a predetermined content part among the plurality of content parts has arrived at a screen-side reference position set at a browser screen side of the terminal device in association with scroll in a forward direction or not, and a display control process that slows a scroll following speed of a content part subsequent to the page-side reference position than a scroll following speed of a content part preceding the page-side reference position, corresponding to further scroll in the forward direction after the page-side reference position has arrived at the screen-side reference position, and causes an additional content to appear in a space that is expanding between the page-side reference position and the preceding content part by the slowing, and a web page transmitter that transmits the web page data generated by the web page data generating unit to the terminal device of a requestor.

According to the web page data as described above, the additional content appears on the web page in a behavior different from those of the other content parts that are scrolled, thus easily obtaining attention to this additional content from a user. The additional content is caused to appear in a space part generated between the content parts in association with the scroll. Thus, for example, compare with a case where the additional content is caused to appear superimposed on the other content parts, the additional content is less likely to be an obstacle in browsing of the other content parts.

In the information processing device according to the above-described present invention, the following is preferable. The web page data generating unit generates the web page data that causes the terminal device to execute a process that accelerates a scroll following speed of a content part at an inverse scroll direction side of the page-side reference position than a scroll following speed of the other content parts to decrease the space, corresponding to further scroll after the additional content has fully appeared.

This closes the additional content that has fully appeared in association with the scroll, corresponding to the further scroll in the forward direction.

In the information processing device according to the above-described present invention, the following is preferable. The web page data generating unit generates the web page data that causes the terminal device to execute a process that sets the screen-side reference position such that the expansion of the space is started in a state where at least a part of the subsequent content part has been displayed within the browser screen.

In view of this, the expansion of the display space of the additional content is started in a state where it is apparent that the subsequent part of the page-side reference position exists.

In the information processing device according to the above-described present invention, the following is preferable. The web page data generating unit generates the web page data that causes the terminal device to execute a process that sets the screen-side reference position such that a center in the scroll direction of the additional content that has fully appeared is positioned at a center in the scroll direction of the browser screen.

This allows the additional content to more easily attract attention.

In the information processing device according to the above-described present invention, the following is preferable. Image sizes of the plurality of content parts are uniformed, and an image size of the additional content that has fully appeared is equal to or less than the image sizes of the content parts.

This allows the additional content to be less likely to be the obstacle in browsing of the content.

In the information processing device according to the above-described present invention, the following is preferable. The web page data generating unit generates the web page data where a plurality of content part rows where a plurality of content parts are arrayed in the scroll direction are disposed in parallel, and the web page data generating unit causes the terminal device to execute the arrival determination process and the display control process for a specific content part row among the plurality of content part rows.

Thus causing the additional content to appear only for the specific content part row allows the additional content to be caused to appear while the content parts nearby the appearance position of the additional content follow the scroll as usual, thus allowing the appearance of the additional content to be more emphasized.

In the information processing device according to the above-described present invention, the following is preferable. The web page data generating unit generates the web page data that causes the terminal device to execute the arrival determination process and the display control process for a content part row whose length in the scroll direction is the shortest among the plurality of content part rows.

This can reduce a disposition displacement of the content parts between the content part rows at an end side in the inverse scroll direction when the additional content has fully appeared.

A first program according to the present invention is a program executed by an information processing device that executes display control for a web page on which a plurality of content parts are arrayed in a scroll direction, and the program causes the information processing device to execute a process for ensuring an arrival determination function that determines whether a page-side reference position set as an end position in a forward scroll direction of a predetermined content part among the plurality of content parts has arrived at a screen-side reference position set at a browser screen side of the information processing device in association with scroll in a forward direction or not, and a display control function that slows a scroll following speed of a content part subsequent to the page-side reference position than a scroll following speed of a content part preceding the page-side reference position, corresponding to further scroll in the forward direction after the page-side reference position has arrived at the screen-side reference position, and causes an additional content to appear in a space that is expanding between the page-side reference position and the preceding content part by the slowing.

With such a first program, the above-described process of the terminal device can be ensured by the information processing device. Thus, the attention to the additional content from the user can be easily obtained, and the display of the additional content can be made be less likely to be the obstacle in browsing of the other content parts.

An information processing method according to the present invention is an information processing method in which an information processing device executes a web page data generating step that generates web page data as web page data to cause a terminal device to display a web page on which a plurality of content parts are arrayed in a scroll direction, the web page data causes the terminal device to execute an arrival determination process that determines whether a page-side reference position set as an end position in the scroll direction of a predetermined content part among the plurality of content parts has arrived at a screen-side reference position set at a browser screen side of the terminal device in association with scroll or not, and a display control process that slows a scroll following speed of a content part at an inverse scroll direction side of the page-side reference position than a scroll following speed of the other content parts, corresponding to further scroll after the page-side reference position has arrived at the screen-side reference position, and causes an additional content to appear in a space that is expanding between the page-side reference position and the content part at a scroll direction side of the page-side reference position by the slowing, and a web page transmitting step that transmits the web page data generated in the web page data generating step to the terminal device of a requestor.

Such an information processing method can obtain effect similar to that of the above-described information processing device according to the present invention.

Furthermore, a second program according to the present invention is a program that causes an information processing device to execute a process executed as the above-described information processing method.

Further, a storage medium according to the present invention is a storage medium that stores the above-described second program. These program and storage medium ensure the above-described information processing device.

Advantageous Effects of the Invention

With the present invention, the additional content can be presented on the web page, while managing to easily obtain the attention to the additional content from the user and not to cause the additional content to be the obstacle in browsing of the content at the same time.

DETAILED DESCRIPTION

Figure 1:
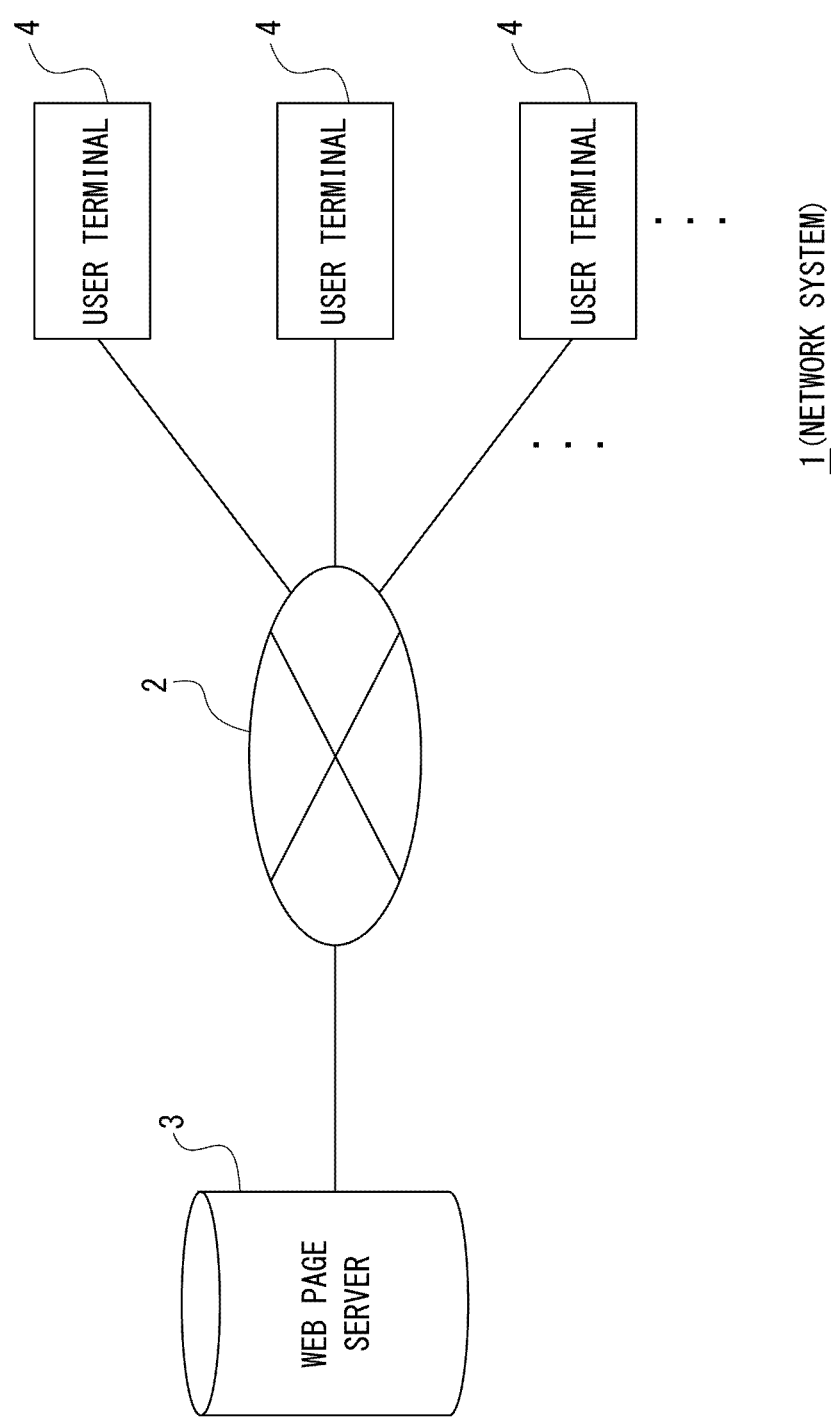
FIG. 1 is a view illustrating an exemplary network system of an embodiment.

The following describes an embodiment in the order listed below.
1. Outline of Network System
2. Hardware Configuration of Computer Device
3. Presentation Method of Additional Content as Embodiment
4. Procedure
5. Summary of Embodiment
6. Program and Storage Medium
7. Modification 1. Outline of Network System FIG. 1 illustrates an exemplary network system 1 as a premise in the embodiment.

The network system 1 is configured such that a web page server 3 and a plurality user terminals 4, 4 . . . , 4 can communicate one another via a network 2, for example, as the Internet.

The user terminal 4 is a computer device that includes a web browser. As the user terminal 4, for example, a high function mobile phone (smart phone), a mobile phone, a portable information terminal (PDA), and a portable or stationary personal computer (PC) are included. However, a type of the user terminal 4 is not limited to these.

The user terminal 4 transmits a Hypertext Transfer Protocol (HTTP) request to the web page server 3 or the like to request a web page and a predetermined process. The user terminal 4 receives the web page (web page data) transmitted corresponding to the HTTP request to display it on a web browser. This allows a user to browse and operate a desired web page.

The web page server 3, which is constituted of a computer device, executes various processes regarding a predetermined website. The web page server 3 mainly functions as a web page deliver server that delivers (transmits) the above-described various web pages corresponding to the request from the user terminal 4.

Figure 2:
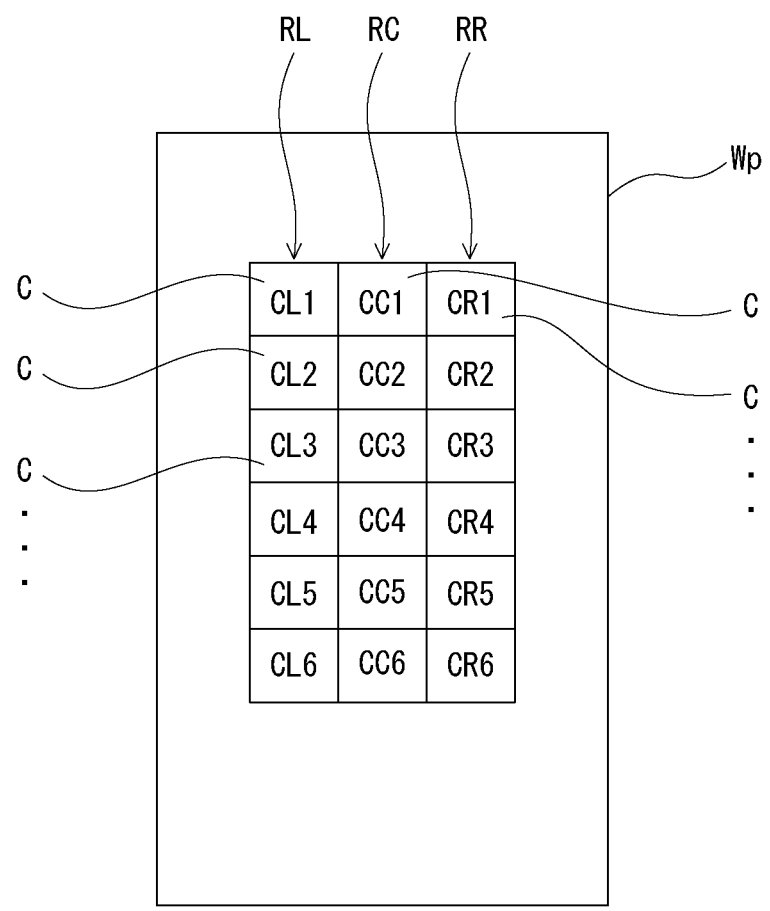
FIG. 2 is a view illustrating an exemplary web page delivered from an information processing device of the embodiment.

FIG. 2 illustrates an exemplary web page Wp delivered from the web page server 3.

In the web page Wp in this example, a content part row R where a plurality of content parts C are arrayed in a vertical direction (in this example, corresponding to a scroll direction, which is described later) is disposed. The content part C, which is, for example, a part for presenting visual information such as an image and a character, is disposed at a required position on the web page Wp with a required frame size (image size: the number of pixels).

In this example, a plurality of content part rows R are disposed in parallel, and specifically a center content part row RC, and a content part row RL and a content part row RR disposed right and left of it, three in total are disposed.

In the drawing, an example where six content parts C are arrayed in each content part row R is illustrated. The respective content parts C that constitute the respective content part rows RL, RC, and RR are indicated sequentially from un upper side, by content parts CL1, CL2, . . . , CL6, content parts CC1, CC2, . . . , CC6, and content parts CR1, CR2, . . . , CR6 respectively.

In this example, image sizes of the respective content parts C are uniformed. Positions in the vertical direction of the content parts C having an identical last numerical value (the content part C having an identical disposition order in the scroll direction) are aligned between the content part rows RL, RC, and RR.

It is not really necessary that the number of the content parts C and the image sizes of the respective content parts C in each content part row R are coincident with one another.

The description will be given returning to FIG. 1.

In the network system 1, the web page Wp as described above is delivered to the user terminal 4 corresponding to the request, and the user can browse contents in the web page Wp via a browser screen G (not illustrated in FIG. 1) of this user terminal 4.

In this respect, when the user browses the contents in the web page Wp via the browser screen G, from relation of the image sizes between the browser screen G and the web page Wp, scroll of the web page Wp is possibly performed.

In the web page Wp in this example, in a process where such scroll is performed, an additional content (in the following, a target image Tg as its one example) is caused to appear. However, this will be described later again.

Here, in this description, the scroll means moving the web page with respect to a screen (in this example, the browser screen G) in a predetermined direction. For example, a vertical scroll means moving the web page with respect to the screen in an upward direction or a downward direction.

The scroll direction means a direction that moves the web page with respect the screen. For example, for the scroll when the web page is browsed from a top of the page to a lower side, since this scroll is a scroll that moves the web page with respect to the screen in the upward direction, the scroll direction is the upward direction. At this time, as the scroll direction, a forward direction and an inverse direction are defined based on a page top position (an initial display position of the web page). Specifically, a direction of a scroll performed for displaying contents that is impossible to be fully displayed from the initial display position is the forward direction (see a transition from FIG. 6 to FIG. 7: hereinafter also referred to as a "forward scroll direction"). And, a direction of a scroll performed for conversely returning to the initial display position side is an inverse direction (hereinafter also referred to as an "inverse scroll direction").

In FIG. 1, various examples are assumed as a configuration of the network 2. For example, from the Internet, an intranet, an extranet, a Local Area Network (LAN), a Community Antenna TeleVision (CATV) communications network, a Virtual Private Network, a telephone line network, a mobile communications network, a satellite communications network, or the like are assumed.

Various examples are also assumed as a transmission medium that constitutes all or a part of the network 2. For example, infrared such as the Institute of Electrical and Electronics Engineers (IEEE) 1394, a Universal Serial Bus (USB), a power-line carrier, and a telephone line, and wireless such as infrared such as the Infrared Data Association (IrDA), the Bluetooth (registered trademark), the 802.11 wireless, a mobile phone network, a satellite channel, and the ground wave digital network are applicable.

2. Hardware Configuration of Computer Device

Figure 3:
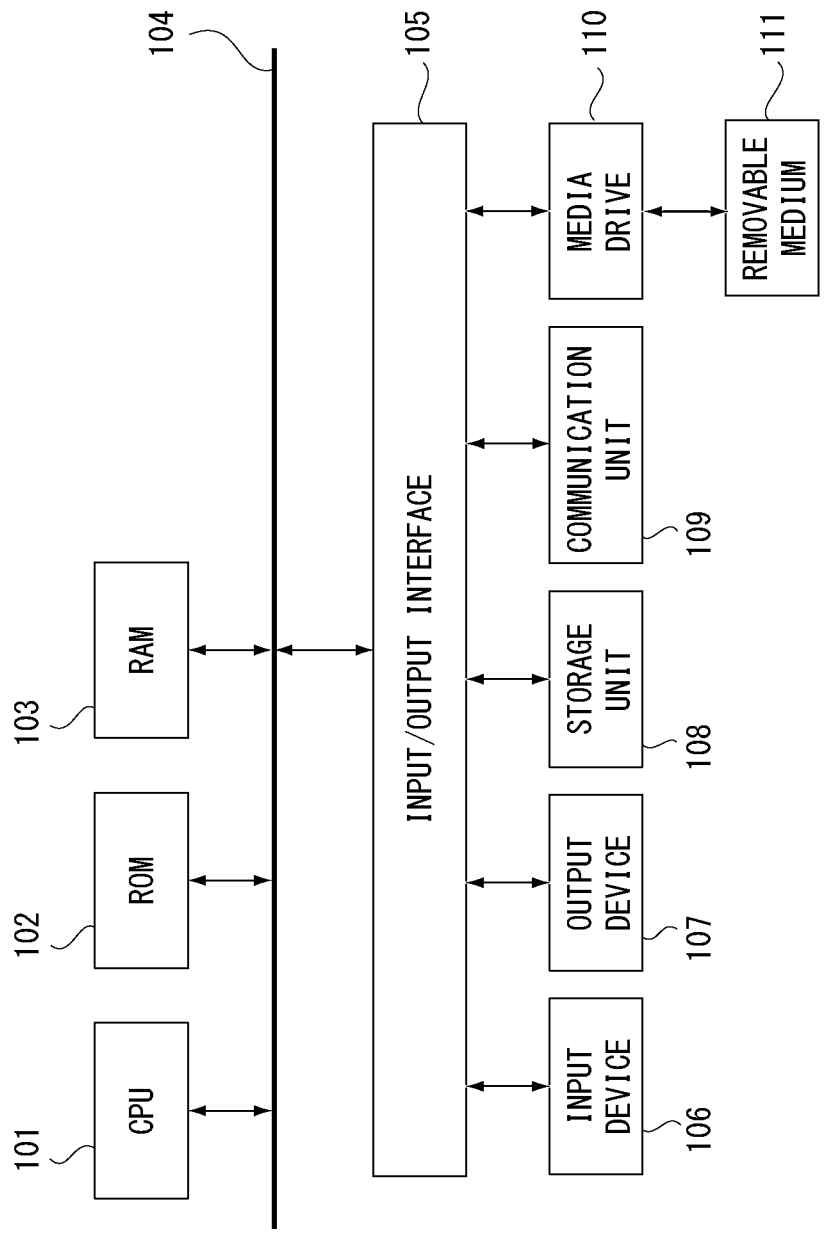
FIG. 3 is a block diagram illustrating a hardware configuration of a computer device that constitutes the network system of the embodiment.

FIG. 3 illustrates a hardware configuration of the computer devices that constitute the respective devices (the web page server 3 and the user terminal 4) illustrated in FIG. 1.

In FIG. 3, a Central Processing Unit (CPU) 101 of the computer device executes various processes in accordance with a program stored in a Read Only Memory (ROM) 102, or a program loaded into a Random Access Memory (RAM) 103 from a storage unit 108. In the RAM 103, data and the like required for the CPU 101 to execute the various processes are also stored as necessary.

The CPU 101, the ROM 102, and the RAM 103 are mutually coupled via a bus 104. To this bus 104, an input/output interface 105 is also coupled.

To the input/output interface 105, an input device 106 constituted of a keyboard, a computer mouse, a touchscreen, and the like, an output device 107 constituted of a display (display device) formed of a Liquid Crystal Display (LCD), a Cathode Ray Tube (CRT), an Organic Electroluminescence (OEL) panel, or the like, a speaker, and the like, the storage unit 108 constituted of a Hard Disk Drive (HDD), a flash memory device, and the like, and a communication unit 109 for mutually communicating with an external device are coupled.

To the input/output interface 105, a media drive 110 is also coupled as necessary. On the media drive 110, a removable medium 111 such as a magnetic disk, an optical disk, a magnet-optical disk, a semiconductor memory, or the like is mounted as necessary, and writing and reading of information is executed with respect to the removable medium 111.

In such a computer device, upload and download of the data and the program is executed by communication by the communication unit 109, and delivery and receipt of the data and the program via the removable medium 111 is possible.

The CPU 101 executes processing operation based on the various program. This causes especially the computer device as the web page server 3 to execute information processing and communication, which are described later.

3. Presentation Method of Additional Content as Embodiment

Figure 4:
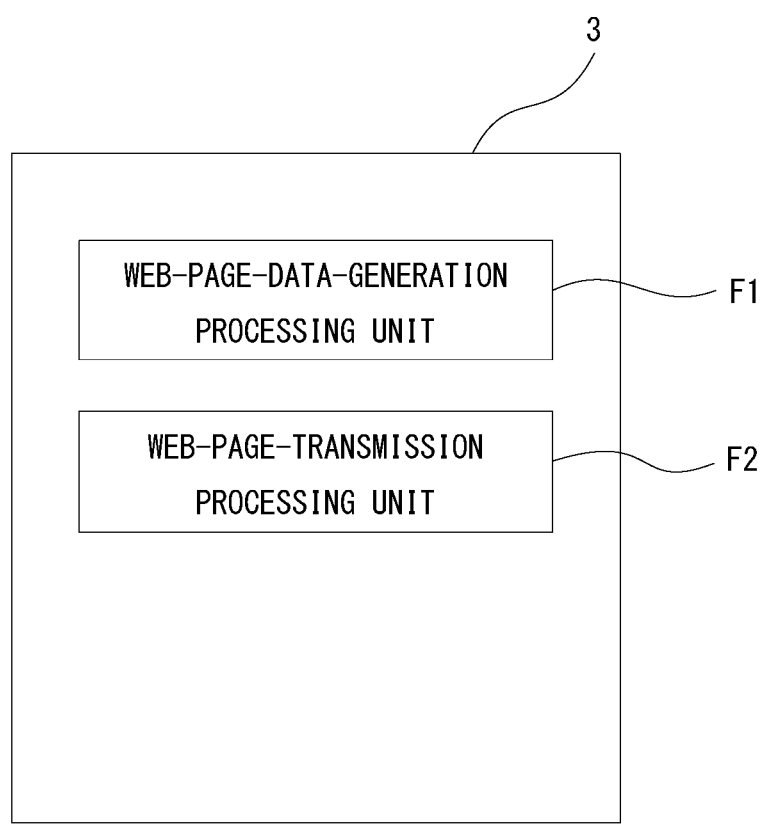
FIG. 4 is a function block diagram illustrating processes according to the embodiment divided by functions to be blocked.

With reference to FIG. 4, a description will be given of various functions according to the presentation of the target image Tg on the web page Wp.

FIG. 4 illustrates processes for ensuring a presentation method of the additional content as the embodiment among the various processes executed by the web page server 3, by dividing them by functions to be blocked.

As illustrated, the web page server 3 can be presented including a web-page-data-generation processing unit F1 and a web-page-transmission processing unit F2 by being divided by functions.

The web-page-data-generation processing unit F1 generates web page data that causes the user terminal 4 to execute an arrival determination process and a display control process, which are described later, as web page data for causing the user terminal 4 to display the web page Wp. The web page data is, in this example, constituted of data required for displaying the web page Wp on the user terminal 4, such as HyperText Markup Language (HTML) data.

The web-page-transmission processing unit F2 transmits the web page data generated by the web-page-data-generation processing unit F1 to the user terminal 4 of a requestor.

The arrival determination process and the display control process will be described.

The arrival determination process is a process that determines whether a page-side reference position Pt set as an end position in the forward scroll direction of a predetermined content part C among the plurality of content parts C has arrived at a screen-side reference position Pr set at the browser screen G side of the user terminal 4 in association with the scroll in the forward direction of the web page Wp or not.

The display control process is a process that slows a scroll following speed of a content part C subsequent to the page-side reference position Pt than a scroll following speed of a content part C preceding the page-side reference position Pt corresponding to further scroll in the forward direction after the page-side reference position Pt has arrived at the screen-side reference position Pr, and causes the target image Tg to appear in a space that is expanding between the page-side reference position Pt and the above-described preceding content part C by this slowing.

The following specifically describes the arrival determination process and the display control process with reference to FIG. 5 to FIG. 12.

Figure 5:
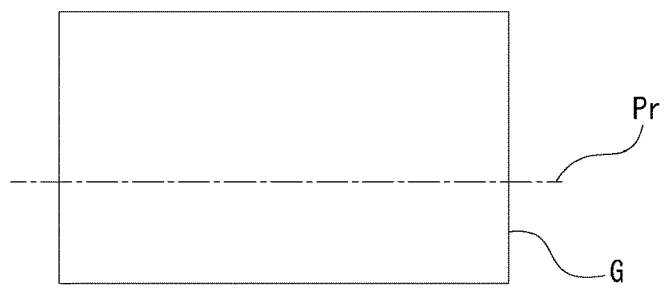
FIG. 5 is an explanatory view of a screen-side reference position.

FIG. 5 is an explanatory view of the screen-side reference position Pr.

The screen-side reference position Pr is a reference position set with respect to the browser screen G side of the user terminal 4, and is set on a predetermined position in the scroll direction (in this example, the vertical direction) on the browser screen G. A specific setting method of the screen-side reference position Pr will be described later.

FIG. 6 to FIG. 12 are explanatory views for the presentation method of the additional content as the embodiment, and schematically illustrate a relationship between the web page Wp and the browser screen G at respective phases in a process where the web page Wp is being scrolled in the upward direction (the scroll in the forward direction).

Figure 6:
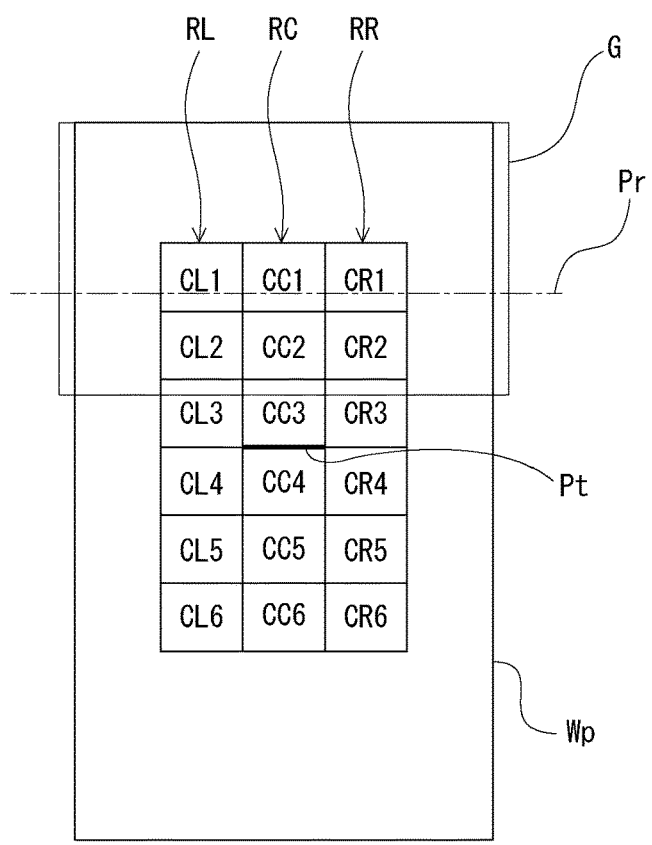
FIG. 6 is an explanatory view for a presentation method of an additional content as the embodiment.

FIG. 6 illustrates an initial display phase (a previous step of the scroll) of the web page Wp where the top of the web page Wp is displayed within the browser screen G.

In this example, the page-side reference position Pt is set on an upper end position (the end position in the forward scroll direction) of the content part CC4 in the center content part row RC. Such a page-side reference position Pt can be also referred to as a boundary position between the content part CC4 and the content part CC3.

At the previous step of the scroll illustrated in FIG. 6, the screen-side reference position Pr is positioned on the upper side with respect to the page-side reference position Pt.

Figure 7:
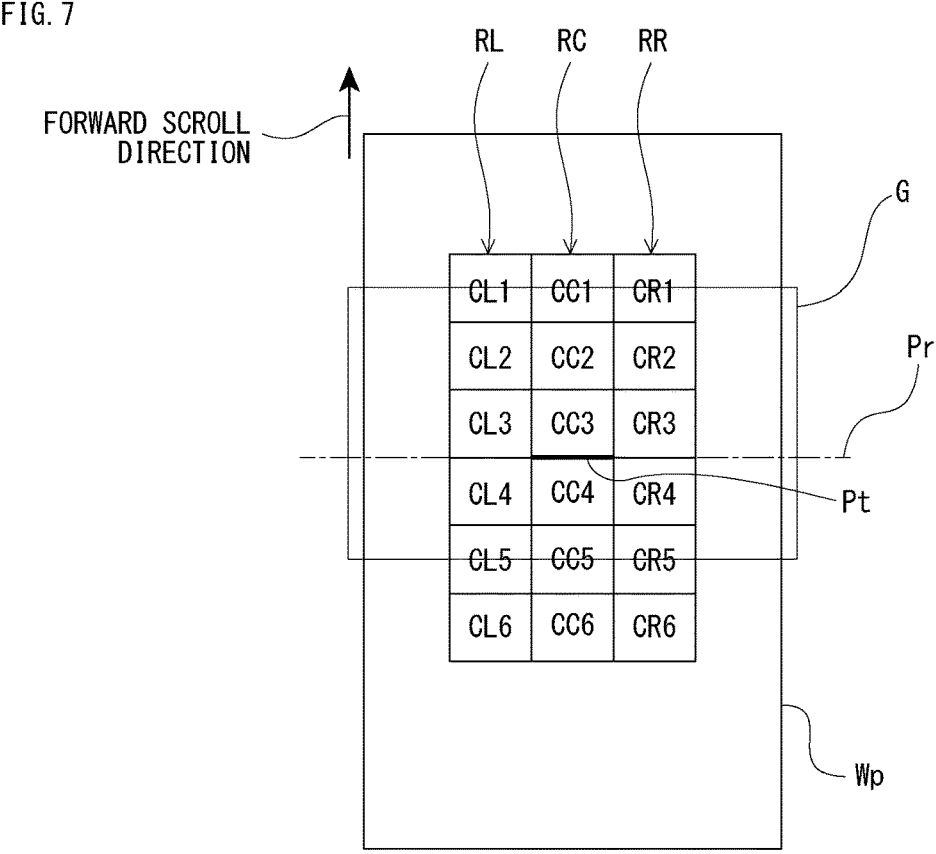
FIG. 7 is similarly an explanatory view for the presentation method of the additional content as the embodiment.

FIG. 7 illustrates a phase where the scroll in the forward direction had been performed from the phase illustrated in FIG. 6, and the page-side reference position Pt has corresponded to the screen-side reference position Pr. The above-described arrival determination process determines whether the page-side reference position Pt has thus corresponded to the screen-side reference position Pr in accordance with the scroll in the forward direction or not.

Corresponding to further scroll in the forward direction from the phase illustrated in FIG. 7, among the respective content parts C in the web page Wp, a scroll following speed of the content parts C at the lower side (an inverse scroll direction side) of the page-side reference position Pt (the content parts subsequent to the page-side reference position Pt: in this example, CC4 to CC6) is slowed than a scroll following speed of other content parts C (the respective content parts C in the content part rows RL and RR, and CC1 to CC3). In this example, the scroll following speed of the content parts CC4 to CC6 is decreased to "0" (that is, a scroll following stopped state). In such a scroll following stopped state, the target content parts CC4 to CC6 stop changing a positional relationship with the browser screen G even if the scroll is performed.

Figure 8:
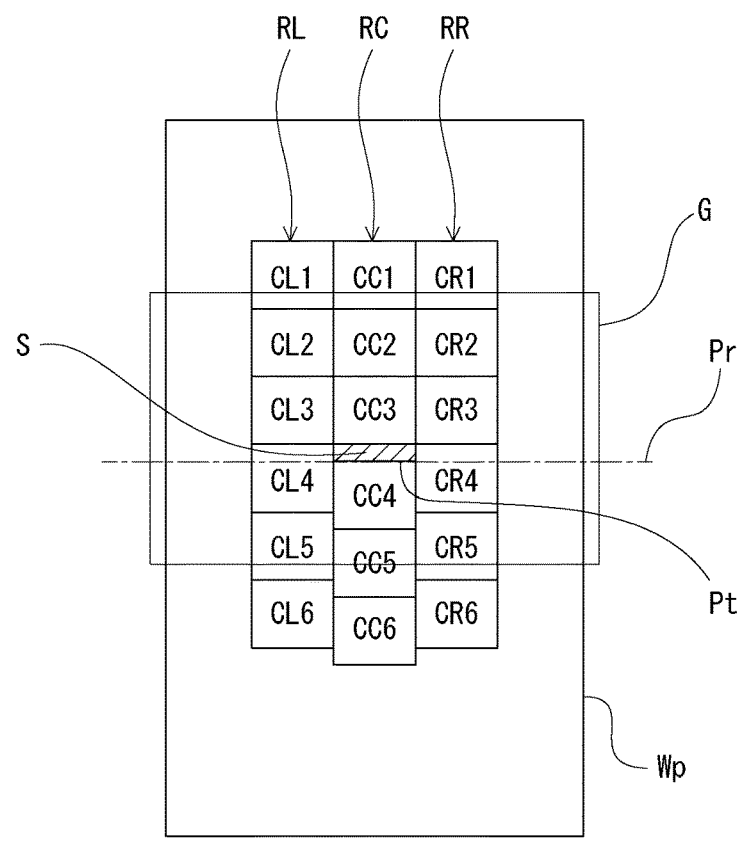
FIG. 8 is similarly an explanatory view for the presentation method of the additional content as the embodiment.
Figure 9:
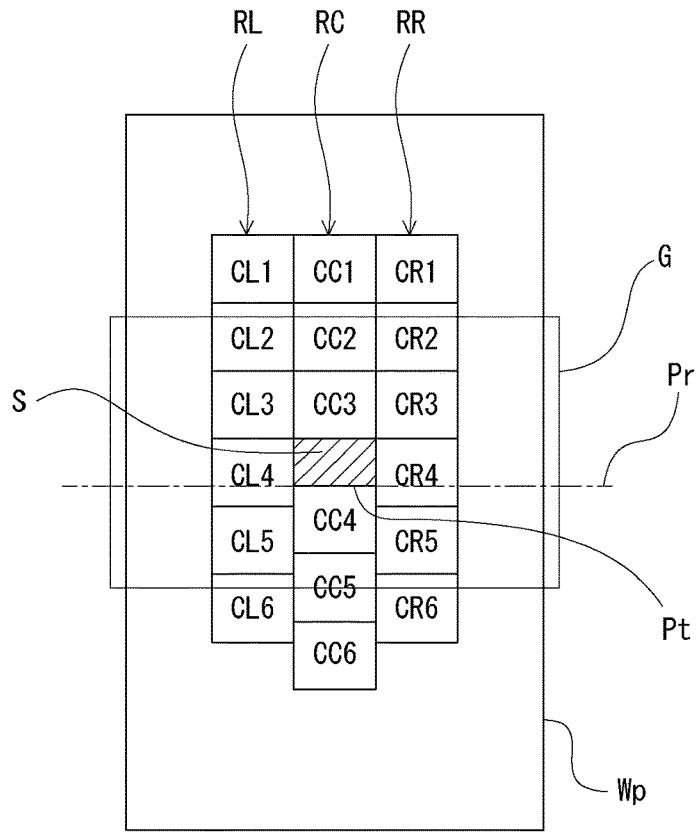
FIG. 9 is similarly an explanatory view for the presentation method of the additional content as the embodiment.
Figure 10:
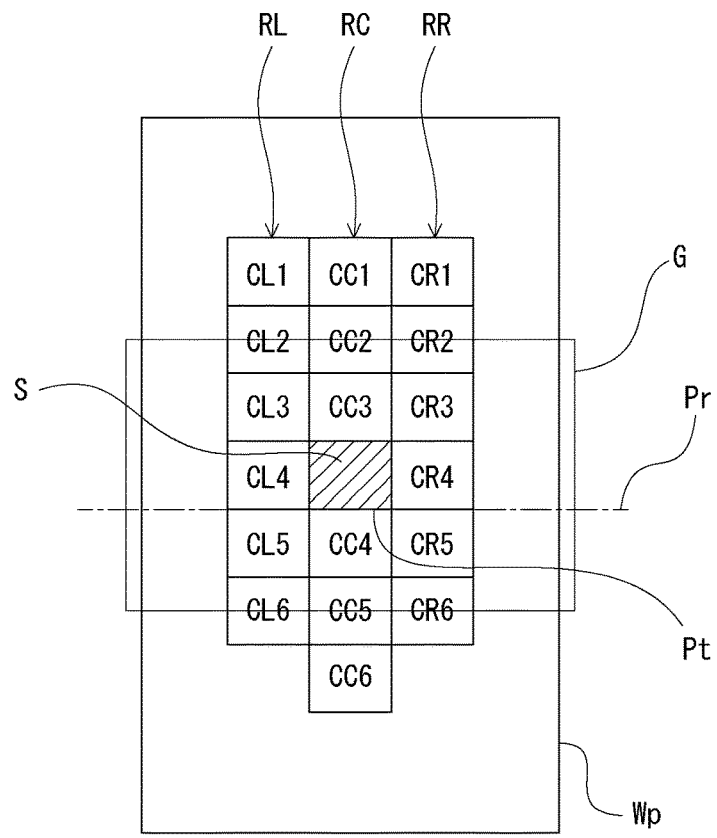
FIG. 10 is similarly an explanatory view for the presentation method of the additional content as the embodiment.

According to this, as illustrated as a transition from FIG. 8 to FIG. 10, between the page-side reference position Pt and the content part CC3 (that is, the content part C preceding the page-side reference position Pt), a space S that is gradually expanding in association with progress of the scroll is formed.

In the above-described display control process, in thus formed space S, the predetermined target image Tg is caused to appear.

Here, in this example, the web page Wp has a layer structure. Specifically, the web page Wp includes an upper-layer-side layer on which the content part C is disposed and a lower-layer-side layer on which the target image Tg is disposed. At this time, a disposed position of the target image Tg at the lower-layer-side layer is a position corresponding to a formation position of the space S at the upper-layer-side layer. That is, this disposed position of the target image Tg at the lower-layer-side layer is set on a position where the target image Tg can appear within the space S formed as illustrated in FIG. 8 to FIG. 10.

Thus, forming the space S as described above can cause the target image Tg to appear within this space S.

The disposed position of the target image Tg in this example is set such that the center of the space S when this space S has been maximized (a state in FIG. 10) corresponds to the center of the target image Tg.

Here, the target image Tg is, for example, an advertising image. In this case, the target image Tg may be transmitted as the web page data to the user terminal 4 by the web page server 3, or the user terminal 4 itself may obtain the target image Tg by describing command information that obtains the target image Tg from another server device in the web page data.

A type of the target image Tg is not especially limited.

In this example, the expansion corresponding to the scroll in the forward direction of the space S terminates when an image size in the vertical direction of the space S has corresponded to an image size in the vertical direction of the content part C adjacent to the space S in the lateral direction. That is, in this example where the image sizes of the respective content parts C are uniformed, the largest image size of the space S corresponds to the image size of the content part C.

In this example, the image size of the target image Tg is matched with such the largest image size of the space S. That is, in the case of this example, the image size of the target image Tg corresponds to the image size of the content part C.

The state where the space S has been maximized as in FIG. 10 can be also referred to as a state where the target image Tg has fully appeared (an all appeared state).

In this example, the image size of the target image Tg that has fully appeared corresponds to the image size of the content part C. However, this is not required. It is only necessary that the image size of the target image Tg that has fully appeared is at least equal to or less than the image size of the content part C (this considers being less likely to become the obstacle in browsing of the contents).

Figure 11:
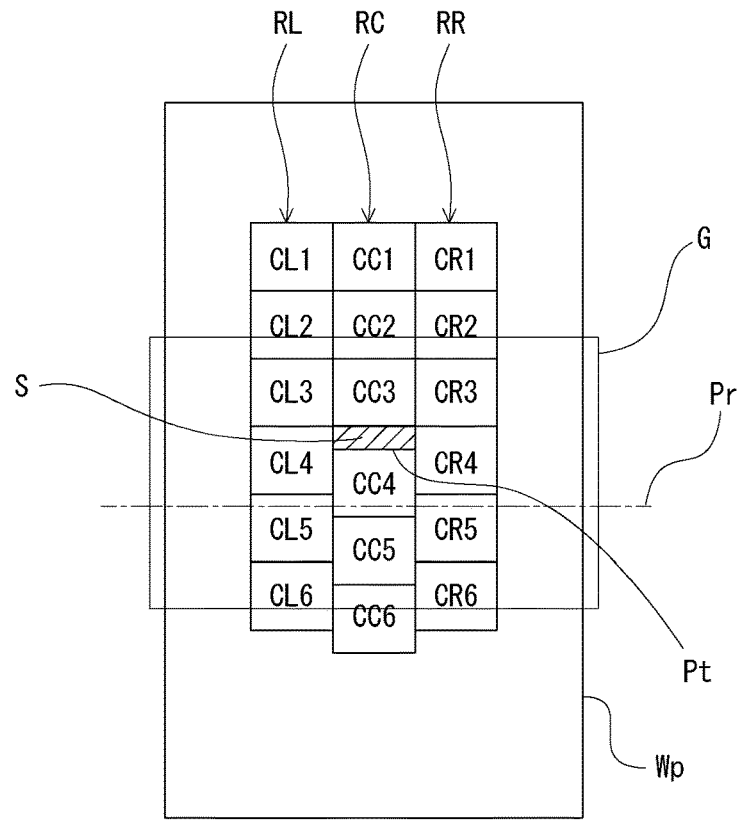
FIG. 11 is similarly an explanatory view for the presentation method of the additional content as the embodiment.
Figure 12:
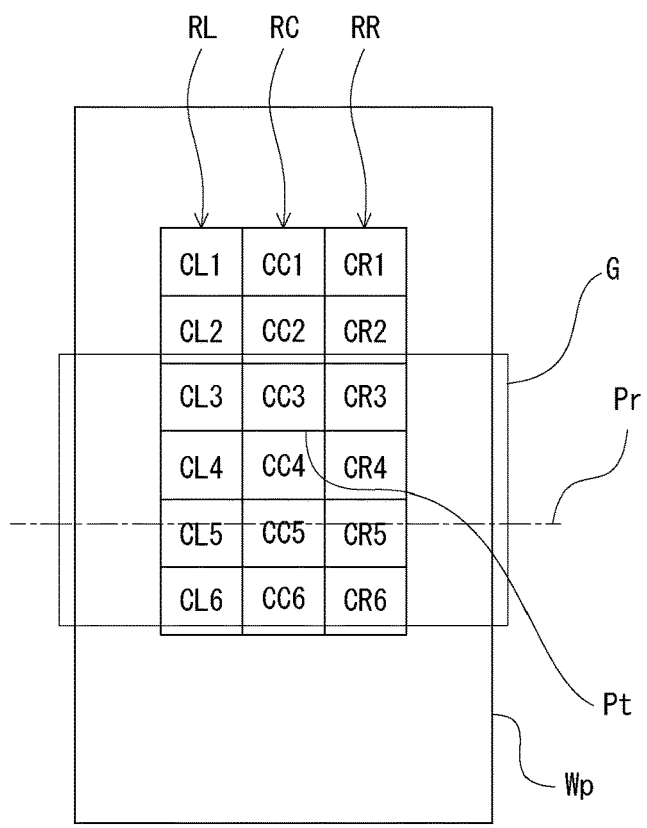
FIG. 12 is similarly an explanatory view for the presentation method of the additional content as the embodiment.

Here, in the display control process in this example, after the target image Tg has fully appeared by expanding the space S at a maximum as described above, the space S is gradually decreased corresponding to further scroll in the forward direction (see FIG. 11 and FIG. 12).

Specifically, corresponding to the further scroll in the forward direction after the target image Tg has fully appeared, the scroll following speed of the content parts C subsequent to the page-side reference position Pt (CC4 to CC6) is accelerated than the scroll following speed of the other content parts C to decrease the space S. That is, the target image Tg that has been in the all appeared state is gradually closed.

This can prevent the target image Tg that has appeared from continuing to be displayed, thus making the target image Tg be less likely to become the obstacle in browsing of the contents.

Although not illustrated, in this example, after the target image Tg has fully appeared and then has been fullyclosed corresponding to the scroll (the scroll in the forward direction) as illustrated as a transition from FIG. 7 to FIG. 12, reappearance of the target image Tg is not performed with respect to the scroll in the inverse direction for returning to the page top side. In the case of this example, the target image Tg is caused to reappear after the page-side reference position Pt has corresponded to the screen-side reference position Pr again by the scroll in the forward direction after the scroll in the inverse direction. Also when the target image Tg has been caused to reappear, the target image Tg is similarly gradually closed corresponding to further scroll after the target image Tg has fully appeared.

In this example, when the scroll in the inverse direction is performed in mid-flow as the target image Tg is caused to appear (from FIG. 7 to FIG. 10), the space S is decreased to close the target image Tg with respect to this scroll in the inverse direction (that is, behavior precisely opposite to that in the scroll in the forward direction is ensured).

Specifically, while maintaining the scroll following stopped state (the state where the scroll following speed=0 of the content parts CC4 to CC6, the other content parts C are caused to follow the scroll in the inverse direction as usual.

Further, in this example, when the scroll in the inverse direction is performed in mid-flow as the target image Tg is closed corresponding to the scroll in the forward direction (from FIG. 10 to FIG. 12), the space S is expanded to gradually expand an appearance area of the target image Tg with respect to this scroll in the inverse direction (that is, the behavior precisely opposite to that in the scroll in the forward direction is ensured). Specifically, while maintaining a state where the scroll following speed of the content parts CC4 to CC6 is accelerated than the scroll following speed of the other content parts C, the other content parts C are caused to follow the scroll in the inverse direction as usual.

Here, in this example, when the target image Tg has been caused to fully appear as illustrated in FIG. 10, the center in the scroll direction of this target image Tg that has fully appeared is set to be positioned at the center in the scroll direction of the browser screen G.

That is, the screen-side reference position Pr is set such that such a relationship between the center at the target image Tg side and the center at the browser screen G side is ensured.

Figure 13:
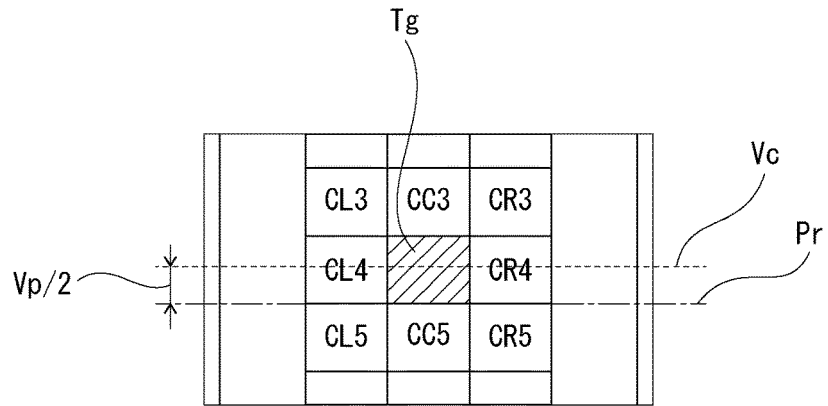
FIG. 13 is an explanatory view for a setting method of the screen-side reference position.

FIG. 13 is an explanatory view for a setting method of the screen-side reference position Pr in this example, and schematically illustrates a display state within the browser screen G at the prior phase in FIG. 10 (the state where the target image Tg has fully appeared).

In FIG. 13, "Vc" in the drawing represents the center in the scroll direction of the browser screen G. To match the center in the scroll direction of the target image Tg that has fully appeared with the center Vc of the browser screen G, the screen-side reference position Pr may be set as follows, based on the number of pixels in scroll direction of the target image Tg (in this example, the number of vertical pixels: hereinafter referred to as "Vp"). That is, it is only necessary that the screen-side reference position Pr is set as a position below the center Vc of browser screen G by "Vp/2" pixels.

Ensuring the positional relationship between the center of the target image Tg in all appearance and the center Vc of the browser screen G as described above can make the target image Tg more easily attract attention.

The above-described setting of the screen-side reference position Pr is only one example. It is only necessary for the screen-side reference position Pr to be set such that the expansion of the space S is started in a state where at least a part of the content parts C (CC4 to CC6) subsequent to the page-side reference position Pt is displayed within the browser screen G (see FIG. 7 and FIG. 8).

In view of this, the expansion of a display space of the target image Tg is started in a state where it is apparent that the subsequent parts of the page-side reference position Pt (the content parts C at the lower side of the page-side reference position Pt) exist. Thus, this can prevent the subsequent parts from being overlooked without the user noticing the existence of the subsequent parts (overlooked without scrolling).

To ensure this, it is only necessary, on the assumption that the number of the pixels in the vertical direction of the browser screen G is larger than the number of the pixels in the vertical direction of the content part C at which the page-side reference position Pt is set, to set the screen-side reference position Pr at a position at the upper side of a lower end position of the browser screen G.

4. Procedure

Subsequently, with reference to flowcharts in FIG. 14 and FIG. 15, the following describes a procedure of processes to be executed by the user terminal 4 for ensuring the presentation method of the additional content as the above-described embodiment.

Figure 14:
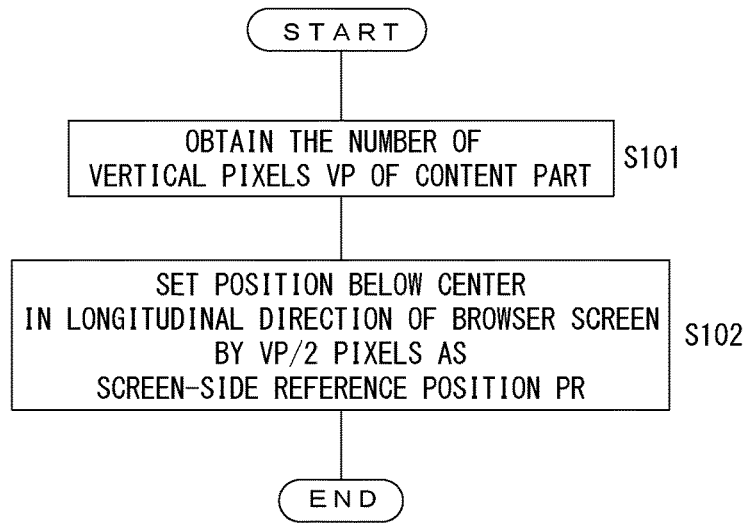
FIG. 14 is a flowchart illustrating a setting process of the screen-side reference position.
Figure 15:
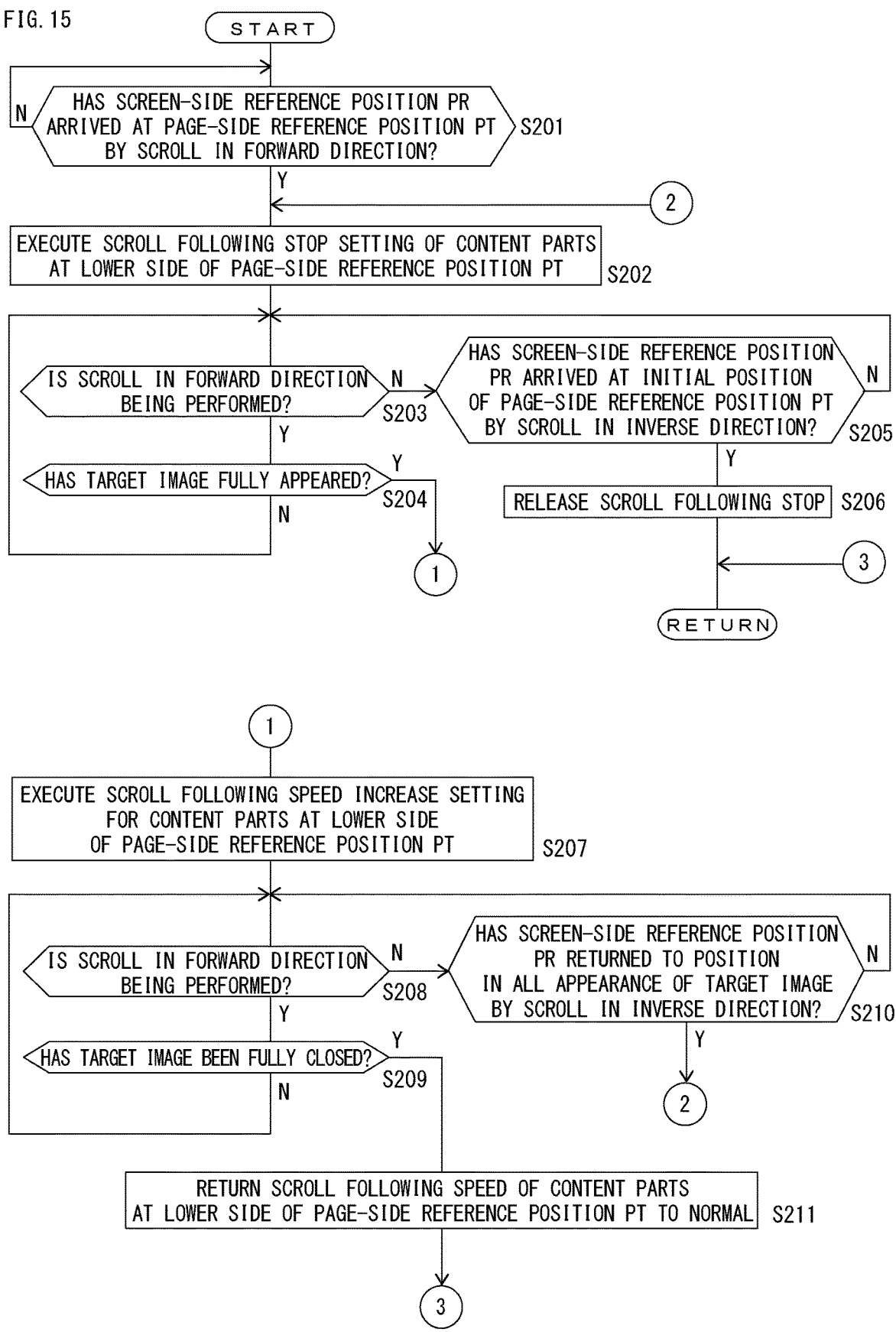
FIG. 15 is a flowchart of an arrival determination process and a display control process.

As understood from the above-described description, the web page server 3 in this example generates the web page data that causes the user terminal 4 to execute the processes illustrated in these FIG. 14 and FIG. 15, and then, transmits this web page data to the user terminal 4 of the requestor.

FIG. 14 is a flowchart illustrating the setting process of the screen-side reference position Pr.

The process illustrated in FIG. 14 is executed in accordance with the command information described in the web page data for the web page Wp after this web page data has been received from the web page server 3.

In FIG. 14, the user terminal 4 obtains the number of the vertical pixels Vp of the content part C at Step S101. The number of the vertical pixels Vp can be obtained based on the received web page data.

At subsequent Step S102, the user terminal 4 sets position below the center Vc in the longitudinal direction of the browser screen G by Vp/2 pixels as the screen-side reference position Pr, and then, ends the process illustrated in FIG. 14.

FIG. 15 is a flowchart of the arrival determination process and the display control process.

The process illustrated in FIG. 15 is started corresponding to that the screen-side reference position Pr has been set by the process in FIG. 14.

First, the user terminal 4 determines whether the screen-side reference position Pr has arrived at the page-side reference position Pt by the scroll in the forward direction or not at Step S201, and then, when determining that the screen-side reference position Pr has not arrived, executes the determination process at Step S201 again.

On the other hand, when the user terminal 4 determines that the screen-side reference position Pr has arrived, the user terminal 4 proceeds to Step S202 to execute scroll following stop setting of the content parts C at the lower side of the page-side reference position Pt.

This scroll following stop setting is setting that causes the target content part C not to follow the scroll (also including the scroll in the inverse direction) (that is, makes the follow speed=0).

As understood from the prior description, if the scroll in the forward direction is performed under this setting, the space S is expanding at the upper side of the page-side reference position Pt. Then, the target image Tg gradually appears. If the scroll in the inverse direction is performed under this setting, in a state where the target image Tg has appeared, this target image Tg will be gradually closed.

As described above, the web page Wp in this example includes the upper-layer-side layer on which the content part C is disposed and the lower-layer-side layer on which the target image Tg is disposed. In this example, further, the upper-layer-side layer is divided into a first layer and a second layer. On the first layer, the content parts C (CC4 to CC6) at the lower side of the page-side reference position Pt are disposed. The second layer is a lower layer of this first layer. On the second layer, the other content parts C are disposed. In this case, as the scroll following speed setting for the content parts C at the lower side of the page-side reference position Pt at above-described Step S202 and the like, the scroll following speed setting for the first layer is executed. The scroll following speed of the first layer is differentiated from the scroll following speed of the second layer. This can differentiate the scroll following speed of the content parts C at the lower side of the page-side reference position Pt from the scroll following speed of the other content parts C.

At subsequent Step S203, the user terminal 4 determines whether the scroll in the forward direction is being performed or not. When the scroll in the forward direction is being performed, the user terminal 4 proceeds to Step S204, and determines whether the target image Tg has fully appeared or not.

That is, the user terminal 4 determines whether the space S has become in a state expanded at a maximum or not.

When the user terminal 4 determines that the target image Tg has not fully appeared, the user terminal 4 returns to Step S203. That is, during the scroll in the forward direction until when the target image Tg has fully appeared, the above-described scroll following stop setting is continued to gradually expand the space S.

On the other hand, when the user terminal 4 determines that the target image Tg has fully appeared, the user terminal 4 proceeds with the process to Step S207, which will be described later.

At prior Step S203, when the user terminal 4 determines that the scroll in the forward direction is not being performed, the user terminal 4 proceeds to Step S205, and determines whether the screen-side reference position Pr has arrived at an initial position of the page-side reference position Pt (the page-side reference position Pt before the expansion of the space S illustrated in FIG. 6 and FIG. 7) by the scroll in the inverse direction or not. This corresponds to determining whether the screen-side reference position Pr has arrived at the initial position of the page-side reference position Pt by the scroll in the inverse direction after the arrival at the page-side reference position Pt had been determined at Step S201, and the expansion of the space S has started, or not.

When the user terminal 4 determines that the screen-side reference position Pr has not arrived at Step S205, the user terminal 4 returns to Step S203.

On the other hand, when the user terminal 4 determines that the screen-side reference position Pr has arrived at Step S205, the user terminal 4 proceeds to Step S206, and releases the scroll following stop setting to be "RETURN" (returns to Step S201).

Thus, after the screen-side reference position Pr has arrived at the initial position of the page-side reference position Pt by the scroll in the inverse direction, all the content parts C within the web page Wp are inversely scrolled as usual (evenly) corresponding to further scroll in the inverse direction. When the scroll direction shifts to the forward direction after the scroll following stop release has been executed at Step S206, the arrival is determined by the determination process at Step S201, thus making a state where the expansion of the space S can be started again.

Subsequently, the following describes the process after Step S207 (the process after the target image Tg has fully appeared).

At Step S207, the user terminal 4 executes scroll following speed increase setting for the content parts C at the lower side of the page-side reference position Pt. This setting is setting that increases a following speed with respect to the scroll (also including the scroll in the inverse direction) of the target content parts C than a following speed of the other content parts C.

At subsequent Step S208, the user terminal 4 determines whether the scroll in the forward direction is being performed or not. When the scroll in the forward direction is being performed, the user terminal 4 proceeds to Step S209, and determines whether the target image Tg has all been closed or not. That is, the user terminal 4 determines whether the page-side reference position Pt has returned to the initial position, and the space S has become in a vanished state or not.

When the user terminal 4 determines that the target image Tg has not been fully closed, the user terminal 4 returns to Step S208. That is, after the target image Tg has fully appeared, during the scroll in the forward direction until when the target image Tg has been fully closed, the above-described scroll following speed increase setting is continued, thus gradually decreasing the space S.

On the other hand, when the user terminal 4 determines that the target image Tg has been fully closed, the user terminal 4 proceeds to Step S211, and executes setting that returns the scroll following speed of the content parts C at the lower side of the page-side reference position Pt to normal to be "RETURN."

Thus, after the target image Tg has fully appeared and then, has been fully closed corresponding to the scroll in the forward direction, the reappearance of the target image Tg is not performed with respect to the scroll in the inverse direction. As described before, in the case of this example, the target image Tg can be caused to reappear, after the page-side reference position Pt has corresponded to the screen-side reference position Pr again by the scroll in the forward direction after the scroll in the inverse direction.

At prior Step S208, when the user terminal 4 determines that the scroll in the forward direction is not being performed, the user terminal 4 proceeds to Step S210, and determines whether the screen-side reference position Pr has returned to a position in all appearance of the target image (the position at the phase in FIG. 10: in this example, the position below the initial position of the page-side reference position Pt by the number of the vertical pixels of the content part C) by the scroll in the inverse direction or not. This corresponds to determining whether the screen-side reference position Pr has been returned to the above-described position in all appearance by the scroll in the inverse direction since the determination that the target image Tg has fully appeared (S204) until the determination that the target image Tg has been fully closed (S209) or not.

When the user terminal 4 determines that the screen-side reference position Pr has not returned to the position in all appearance at Step S210, the user terminal 4 returns to Step S208.

On the other hand, when the user terminal 4 determines that the screen-side reference position Pr has returned to the position in all appearance at Step S210, the user terminal 4 returns to Step S202, and executes the scroll following stop setting for the content parts C at the lower side of the page-side reference position Pt. In view of this, after the screen-side reference position Pr has returned to the position in all appearance of the target image by the scroll in the inverse direction after the all appearance of the target image, when the scroll in the inverse direction is continuously performed, the target image Tg will be closed in the behavior precisely opposite to that in expanding.

On the other hand, after the screen-side reference position Pr has returned to the position in all appearance of the target image by the scroll in the inverse direction after the all appearance of the target image, when the scroll direction has been shifted to the forward direction, this makes the state where it has been determined that the target image Tg had fully appeared at Step S204, and closing operation of the target image Tg can be executed corresponding to the scroll in the forward direction.

The above exemplified that the content part row R that causes the target image Tg to appear is the center content part row RC. However, the user terminal 4 may be able to selectively set the content part row R that causes the target image Tg to appear based on a predetermined condition.

Figure 16:
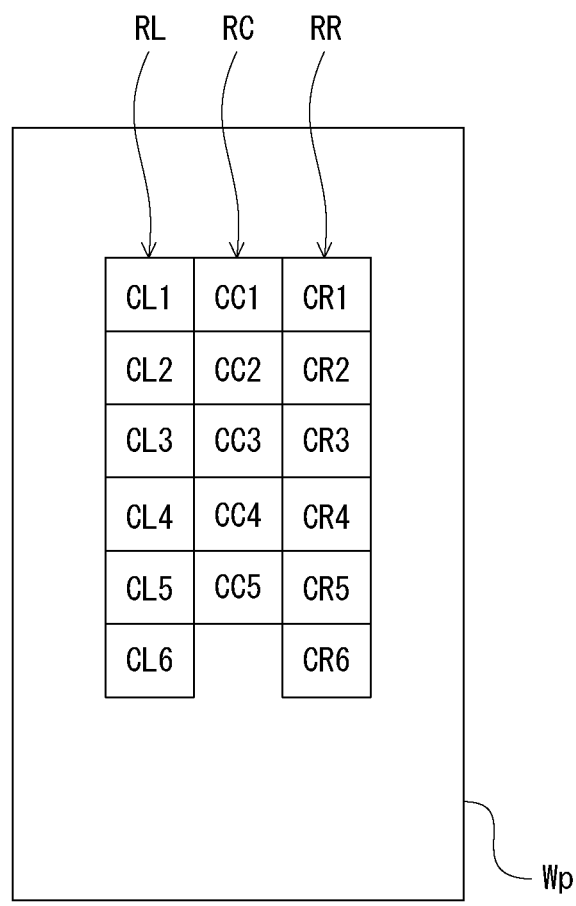
FIG. 16 is an explanatory view for a modification that selects a content part row that causes the additional content to appear.

For example, when lengths in the scroll direction of the content part rows R are not aligned as illustrated in FIG. 16, it is considered that the target image Tg is caused to appear in the content part row R whose length is the shortest.

Here, provisionally, when the target image Tg that has fully appeared is continued to be displayed regardless of presence/absence of the scroll, if the target image Tg is caused to appear with respect to the content part row R whose length in the scroll direction is long, this promotes disposition displacement of the content parts C at the end side in the inverse scroll direction with the content part row R whose length in the scroll direction is short.

If the target image Tg is caused to appear in the content part row R whose length in the scroll direction is the shortest as described above, this can reduce such disposition displacement of the content parts C at the end side in the inverse scroll direction.

In this case, the web page server 3 generates the web page data where the command information for selecting the content part row R that fulfills a condition that "the length in the scroll direction is the shortest" as the content part row R that causes the target image Tg to appear has been described to transmit this web page data to the user terminal 4 of the requestor.

The above exemplified that the plurality of content part rows R are disposed in parallel in the web page Wp. However, the display control method of the present invention is also applicable to the case where only one content part row R is disposed (for example, only the content part row RC is disposed). In this case, for forming the space S, it is only necessary to slow the scroll following speed of the content parts C (CC4 to CC6) subsequent to the page-side reference position Pt than the scroll following speed of the content parts C (CC1 to CC3) preceding the page-side reference position Pt, corresponding to further scroll in the forward direction after it has been determined that the page-side reference position Pt had arrived at the screen-side reference position Pr in accordance with the scroll in the forward direction.

To describe for confirmation, the above-described "preceding" and "subsequent" represent precedence and subsequence based on the forward scroll direction, and "preceding" means the forward scroll direction side, and "subsequent" means the inverse scroll direction side.

5. Summary of Embodiment

As described above, the information processing device (the web page server 3) of the embodiment includes a web page data generating unit (the web-page-data-generation processing unit F1) that generates web page data as web page data to cause a terminal device (the user terminal 4) to display a web page (the web page Wp) on which a plurality of content parts (the content parts C) are arrayed in a scroll direction, the web page data causes the terminal device to execute an arrival determination process that determines whether a page-side reference position (the page-side reference position Pt) set as an end position in a forward scroll direction of a predetermined content part among the plurality of content parts has arrived at a screen-side reference position (the screen-side reference position Pr) set at a browser screen (the browser screen G) side of the terminal device in association with scroll in a forward direction or not, and a display control process that slows a scroll following speed of a content part subsequent to the page-side reference position than a scroll following speed of a content part preceding the page-side reference position, corresponding to further scroll in the forward direction after the page-side reference position has arrived at the screen-side reference position, and causes an additional content (the target image Tg) to appear in a space (the space S) that is expanding between the page-side reference position and the preceding content part by the slowing.

Furthermore, the information processing device (the web page server 3) of the embodiment includes a web page transmitter (the web-page-transmission processing unit F2) that transmits the web page data generated by the web page data generating unit to the terminal device of a requestor.

According to the web page data as described above, the additional content appears on the web page in a behavior different from those of the other content parts that are scrolled, thus easily obtaining attention to this additional content from a user. The additional content is caused to appear in a space part generated between the content parts in association with the scroll. Thus, for example, compare with a case where the additional content is caused to appear superimposed on the other content parts, the additional content is less likely to be an obstacle in browsing of the other content parts.

Therefore, the additional content can be presented on the web page, while managing to easily obtain the attention to the additional content from the user and not to cause the additional content to be the obstacle in browsing of the content at the same time.

According to the information processing device of the embodiment, the web page data generating unit generates the web page data that causes the terminal device to execute a process that accelerates the scroll following speed of the subsequent content part than the scroll following speed of the preceding content part to decrease the space, corresponding to further scroll in the forward direction after the additional content has fully appeared.

This closes the additional content that has fully appeared in association with the scroll, corresponding to the further scroll in the forward direction.

That is, this can prevent the additional content that has fully appeared from continuing to be displayed, thus making the target image Tg be less likely to become the obstacle in browsing of the contents.

Furthermore, according to the information processing device of the embodiment, the web page data generating unit generates the web page data that causes the terminal device to execute a process that sets the screen-side reference position such that the expansion of the space is started in a state where at least a part of the subsequent content part has been displayed within the browser screen.

In view of this, the expansion of the display space of the additional content is started in a state where it is apparent that the subsequent part of the page-side reference position exists. Thus, this can prevent the subsequent part from being overlooked without the user noticing the existence of the subsequent part.

Further, according to the information processing device of the embodiment, the web page data generating unit generates the web page data that causes the terminal device to execute a process that sets the screen-side reference position such that a center in the scroll direction of the additional content that has fully appeared is positioned at a center in the scroll direction of the browser screen.

This allows the additional content to more easily attract attention.

According to the information processing device of the embodiment, image sizes of the plurality of content parts are uniformed, and an image size of the additional content that has fully appeared is equal to or less than the image sizes of the content parts.

This allows the additional content to be less likely to be the obstacle in browsing of the contents.

Furthermore, according to the information processing device of the embodiment, the web page data generating unit generates the web page data where a plurality of content part rows where a plurality of content parts are arrayed in the scroll direction are disposed in parallel, and the web page data generating unit causes the terminal device to execute the arrival determination process and the display control process for a specific content part row among the plurality of content part rows.

Thus causing the additional content to appear only for the specific content part row allows the additional content to be caused to appear while the content parts nearby the appearance position of the additional content follow the scroll as usual, thus allowing the appearance of the additional content to be more emphasized.

Therefore, the attention from the user to the additional content can be more likely to be obtained.

Further, according to the information processing device of the embodiment, the web page data generating unit generates the web page data that causes the terminal device to execute the arrival determination process and the display control process for a content part row whose length in the scroll direction is the shortest among the plurality of content part rows.

This can reduce a disposition displacement of the content parts between the content part rows at an end side in the inverse scroll direction when the additional content has fully appeared.

This is effective especially when the additional content that has fully appeared is continued to be displayed without closing corresponding to the scroll.

6. Program and Storage Medium

The above has described the web page server 3 and the user terminal 4 (the terminal device) as the embodiment according to the present invention. A first program of the embodiment is a program that causes an information processing device (for example, a CPU) to execute the process of the user terminal 4.

The first program of the embodiment is a program executed by an information processing device (the user terminal 4) that executes display control for a web page on which a plurality of content parts are arrayed in a scroll direction, and the program causes the information processing device to execute a process for ensuring an arrival determination function that determines whether a page-side reference position set as an end position in a forward scroll direction of a predetermined content part among the plurality of content parts has arrived at a screen-side reference position set at a browser screen side of the information processing device in association with scroll in a forward direction or not, and a display control function that slows a scroll following speed of a content part subsequent to the page-side reference position than a scroll following speed of a content part preceding the page-side reference position, corresponding to further scroll in the forward direction after the page-side reference position has arrived at the screen-side reference position, and causes an additional content to appear in a space that is expanding between the page-side reference position and the preceding content part by the slowing.

A second program of the embodiment is a program that causes an information processing device (for example, a CPU) to execute the process of the web page server 3. That is, the second program is a program that causes an information processing device to execute a process for ensuring a web page data generating function that generates web page data as web page data to cause a terminal device to display a web page on which a plurality of content parts are arrayed in a scroll direction, and the web page data causes the terminal device to execute an arrival determination process that determines whether a page-side reference position set as an end position in a forward scroll direction of a predetermined content part among the plurality of content parts has arrived at a screen-side reference position set at a browser screen side of the terminal device in association with scroll in a forward direction or not, and a display control process that slows a scroll following speed of a content part subsequent to the page-side reference position than a scroll following speed of a content part preceding the page-side reference position, corresponding to further scroll in the forward direction after the page-side reference position has arrived at the screen-side reference position, and causes an additional content to appear in a space that is expanding between the page-side reference position and the preceding content part by the slowing, and a web page transmitting function that transmits the web page data generated by the web page data generating function to the terminal device of a requestor.

Such programs can ensure the information processing devices as the above-described user terminal 4 and web page server 3.

Then, such programs can be preliminarily stored in, for example, an HDD as a storage medium incorporated in equipment such as a computer device, and a ROM in a microcomputer including a CPU. Alternatively, such programs can be temporarily or permanently loaded (stored) in a removable storage medium such as a semiconductor memory, a memory card, an optical disk, a magnet-optical disk, and a magnetic disk. Such a removable storage medium can be provided as what is called a software package.

Such programs, in addition to being installed on a personal computer or the like from the removable storage medium, can be downloaded from a download website via a network such as the LAN and the Internet.

7. Modification

The present invention is not limited to the above-described concrete examples but various modifications are possible.

For example, the above presents the target image Tg as one example of the additional content. However, the additional content may be, for example, a content formed of only text data, a content including text data, a video content, or a content including audio.

In the above description, the content part row that causes the additional content to appear is only one row. However, a plurality of content part rows can cause the additional content to appear.

In the above description, the case where the present invention is applied to the case where the scroll in the vertical direction is performed corresponding to the vertically elongate web page has been exemplified. However, the present invention is also preferably applicable to a case where the scroll in the lateral direction is performed corresponding to the horizontally long web page.

In the above description, the additional content is not caused to reappear with respect to the scroll in the inverse direction after the additional content has fully appeared and then, has been fully closed corresponding to the scroll in the forward direction. However, this is only one example, and the present invention is not limited to this example.

In the above description, the page-side reference position Pt is disposed at one position among the plurality of content parts that are continuous with one another in the scroll direction. However, by disposing the page-side reference position Pt at a plurality of positions, the additional content (the target image Tg) may be presented at the plurality of positions.

Furthermore, the number of the page-side reference positions Pt (additional content presentation spaces) disposed in one web page Wp, and a size of the space (especially, a length in the scroll direction) may be determined corresponding to the number of the content parts that are continuous with one another in the scroll direction and/or a speed of the scroll. For example, as the number of the content parts that are continuous with one another in the scroll direction decreases, the number of the page-side reference positions Pt (the additional content presentation spaces) disposed in one web page Wp may be decreased, or the length in the scroll direction in the additional content presentation space may be shortened. As a specific determination method, the determination may be performed using a relational expression, for example, "(the number of the content parts that are continuous with one another in the scroll direction)×(a ratio α)=the number of the page-side reference positions Pt (the additional content presentation spaces) disposed in one web page Wp," or the determination may be performed using a table that associates the number of the content parts that are continuous with one another in the scroll direction with the number of the page-side reference positions Pt (the additional content presentation spaces) disposed in one web page Wp.

This restrains the user from feeling that the additional content is the obstacle, as the number of the presented additional contents is too much or the size of the additional content is too large when the number of the content pars that are continuous with one another in the scroll direction is small.

The positions of the screen-side reference position Pr and the page-side reference position Pt can be set as follows.

Figure 17:
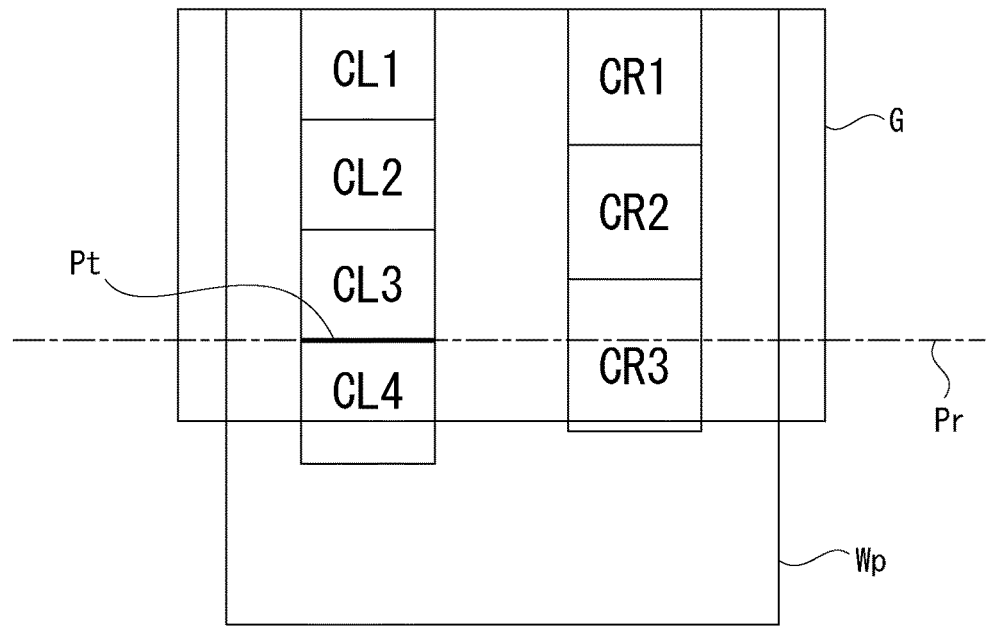
FIG. 17 is an explanatory view of a modification according to the setting of the screen-side reference position based on a content part that has appeared in a page initial screen.

For example, the screen-side reference position Pr can be set such that the additional content does not appear until when the user has finished seeing all the contents that had fully appeared in the initial screen, as illustrated in FIG. 17. Specifically, in the example in FIG. 17, among the lower ends of the content parts C that have appeared on the browser screen G immediately after the page transition, on a position of the lower end of the content part C that has appeared at the most scroll forward direction (for example, a lower part of the screen) side, the screen-side reference position Pr is set.

This can cause the additional content to appear without damaging visibility of the content part that has fully appeared within the page initial screen (the screen positioned on the uppermost portion).

Also for the page-side reference position Pt, similar effect can be obtained by executing position setting similar to the above.

Figure 18:
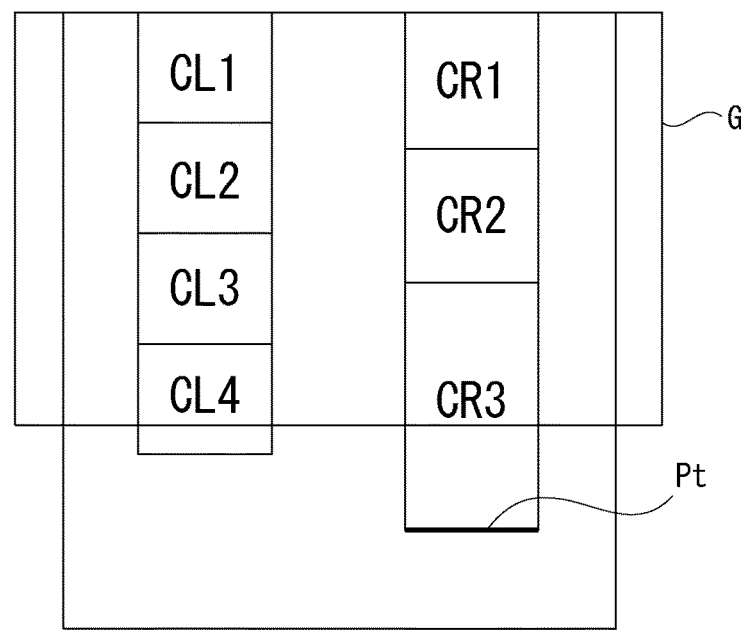
FIG. 18 is an explanatory view of a modification according to setting of a page-side reference position based on the content part that has appeared in the page initial screen.

The page-side reference position Pt, for example, as illustrated in FIG. 18, also can be set such that the additional content does not appear until when the user has finished seeing all the contents that had at least partially appeared in the initial screen. In the example in FIG. 18, among the content parts C that have appeared on the browser screen G immediately after the page transition, on a position of the lower end of the content part C whose lower end is at the most scroll forward direction (for example, a lower part of the screen) side, the page-side reference position Pt is set.

This can cause the additional content to appear without damaging visibility of the content that has at least partially appeared within the page initial screen (the screen positioned on the uppermost portion). In this case, the screen-side reference position Pr can be arbitrarily set.

What is claimed is:

1. An information processing device comprising:
   at least one memory configured to store first program code; and
   at least one first processor configured to access said at least one memory and operate according to said first program code, said first program code including:
      generation code that causes at least one of said at least one first processor to generate web page data, wherein the web page data includes second program code, wherein the second program code is configured to cause a terminal device of a requestor to display a web page on which a plurality of content parts are arrayed in a scroll direction, wherein the second program includes:
         arrival code configured to cause at least one second processor of the terminal device to determine whether a page-side reference position set as an end position in a forward scroll direction of a predetermined content part among the plurality of content parts has arrived at a screen-side reference position set at a browser screen side of the terminal device in association with scroll in a forward direction on the terminal device; and
      display code configured to cause at least one second processor of the terminal device to:
         slow a first scroll following speed of a content part subsequent to the page-side reference position with respect to a second scroll following speed of a content part preceding the page-side reference position after the page-side reference position has arrived at the screen-side reference position, and
         display a portion of an additional content part in a space, wherein the space exists between the page-side reference position and the preceding content part due to a difference in the first scroll following speed and the second scroll following speed; and
      transmission code that causes at least one of said at least one first processor to transmit the second program code to the terminal device of the requestor.

2. The information processing device according to claim 1, wherein the display code is configured to cause at least one second processor of the terminal device to decrease the space after an entirety of the additional content part has appeared.

3. The information processing device according to claim 1, wherein the display code is further configured to cause at least one second processor of the terminal device to only commence an expansion of the space when at least a part of the subsequent content part has been displayed within the browser screen.

4. The information processing device according to claim 1, wherein, when an entirety of the additional content part has appeared,
   a center in the scroll direction of the entirety of the additional content part is positioned at a center in the scroll direction of the browser screen.

5. The information processing device according to claim 1, wherein:
   the plurality of content parts are of a uniform size, and
   an image size of an entirety of the additional content part is equal to or less than the uniform size.

6. The information processing device according to claim 1, wherein:
   the plurality of content parts are arranged in a plurality of content part rows in parallel in the scroll direction, and predetermined content part is associated with one content part row among the plurality of content part rows.

7. The information processing device according to claim 6, wherein
   the one content part row is shortest among the plurality of content part rows.

8. A method comprising:
   generating, by at least a first processor executing first program code, web page data, wherein the web page data includes second program code, wherein the second program code is configured to cause a terminal device of a requestor to display a web page on which a plurality of content parts are arrayed in a scroll direction;
   transmitting, by at least the first processor executing the first program code, the second program code to the terminal device of the requestor;
   determining, by at least a second processor executing the second program code, whether a page-side reference position set as an end position in a forward scroll direction of a predetermined content part among the plurality of content parts has arrived at a screen-side reference position set at a browser screen side of the terminal device in association with scroll in a forward direction on the terminal device;

slowing, by at least the second processor executing the second program code, a first scroll following speed of a content part subsequent to the page-side reference position with respect to a second scroll following speed of a content part preceding the pace-side reference position after the page-side reference position has arrived at the screen-side reference position; and displaying, by at least the second processor executing the second program code, a portion of an additional content part in a space, wherein the space exists between the page-side reference position and the preceding content part due to a difference in the first scroll following speed and the second scroll following speed.

9. A non-transitory computer readable recording medium having recorded therein a program that causes a terminal device to:

determine, by at least one processor of the terminal device, whether a page-side reference position seta as an end position in a forward scroll direction of a predetermined content part among the plurality of content parts has arrived at a screen-side reference position set at a browser screen side of the terminal device in association with scroll in a forward direction on the terminal device;

slow, by at least one processor of the terminal device, a first scroll following speed of a content part subsequent to the page-side reference position with respect to a second scroll following speed of a content part preceding the page-side reference position after the page-side reference position has arrived at the screen-side reference position; and display, by at least one processor of the terminal device, a portion of an additional content part in a space, wherein the space exists between the page-side reference position and the preceding content part due to a difference in the first scroll following speed and the second scroll following speed.

* * * * *